United States Patent [19]

Kuhn et al.

[11] Patent Number: 4,500,972
[45] Date of Patent: Feb. 19, 1985

[54] APPARATUS FOR CONVERTING DIGITAL CHROMINANCE SIGNALS OF A CARTESIAN COLOR COORDINATE SYSTEM INTO DIGITAL COLOR SIGNALS AND SATURATION SIGNALS OF A POLAR COLOR COORDINATE SYSTEM AND A TRANSFORMATION CIRCUIT

[75] Inventors: Franz Kuhn, Schonkirchen; Wilfried Lippek; Klaus Möllgaard, both of Kiel; Friedrich Redecker, Heikendorf, all of Fed. Rep. of Germany

[73] Assignee: Dr.-Ing. Rudolf Hell GmbH, Fed. Rep. of Germany

[21] Appl. No.: 269,015

[22] PCT Filed: Sep. 26, 1980

[86] PCT No.: PCT/DE80/00138
§ 371 Date: Jun. 5, 1981
§ 102(e) Date: May 28, 1981

[87] PCT Pub. No.: WO81/01065
PCT Pub. Date: Apr. 16, 1981

[30] Foreign Application Priority Data

Oct. 5, 1979 [DE] Fed. Rep. of Germany ....... 2940440
Oct. 5, 1979 [DE] Fed. Rep. of Germany ....... 2940422
Oct. 5, 1979 [DE] Fed. Rep. of Germany ....... 2940439

[51] Int. Cl.³ .................... G06F 15/20; G06F 7/548; G01J 3/46
[52] U.S. Cl. .................................... 364/526; 358/11; 358/31; 364/731
[58] Field of Search .................... 364/526; 358/1, 11, 358/75, 80; 364/731, 815

[56] References Cited

U.S. PATENT DOCUMENTS

| | | | |
|---|---|---|---|
| 3,952,187 | 4/1976 | Robinson et al. | 364/731 |
| 4,080,655 | 3/1978 | Bürger et al. | 364/731 X |
| 4,110,826 | 8/1978 | Möllgaard et al. | 364/526 |
| 4,306,296 | 12/1981 | Blaschke | 364/815 |

Primary Examiner—Felix D. Gruber
Attorney, Agent, or Firm—Hill, Van Santen, Steadman & Simpson

[57] ABSTRACT

A method for converting digital chrominance signals of a cartesian color coordinate system into digital color signals and saturation signals of a polar color coordinate system and including a transformation circuit for the transformation from cartesian to polar coordinates.

15 Claims, 5 Drawing Figures

APPARATUS FOR CONVERTING DIGITAL CHROMINANCE SIGNALS OF A CARTESIAN COLOR COORDINATE SYSTEM INTO DIGITAL COLOR SIGNALS AND SATURATION SIGNALS OF A POLAR COLOR COORDINATE SYSTEM AND A TRANSFORMATION CIRCUIT

TECHNICAL FIELD OF THE INVENTION

The invention relates to electronic reproducing technology, particularly to color correction and color recognition.

UNDERLYING PRIOR ART

In electronic reproduction technology, three color components are obtained by means of point-by-point optoelectronic and trichromatic scanning of a master or color, said color components forming the red, green and blue color components of the scanned image points.

The color components represent the coordinates of the respective color in the three-dimensional color space.

In color correction, the measured color components are corrected and the color separation signals required for the production of color separations are derived therefrom, said color separation signals being a measure for the amounts of printing ink required in later printing.

In color recognition, the measured color components are investigated as to their appertaining to one of the color recognition spaces circumscribed within the color space.

The color components can correspond to the three primary measured color value signals, to the chrominance and luminance signals or, on the other hand, can correspond to the tint, saturation and luminance signals. The primary measured color value signals are the cartesian coordinates of the RGB color space and the chrominance and luminance signals are the corresponding cartesian coordinates of the chrominance-luminance color space. The tint, saturation and luminance signals represent the cylindrical coordinates of the tint-saturation-luminance color space, whereby the tint signals form the angles, the saturation signals from the radii and the luminance signals form the third coordinates.

It often proves particularly advantageous to employ the tint, saturation and luminance signals instead of the measured color value signals or instead of the chrominance and luminance signals. In this case, the cartesian color coordinates must be converted into cylindrical color coordinates or polar color coordinates. It is known to undertake such coordinate transformations by means of analog function generators. Said analog function generators, however, have the disadvantage that they are complicated, function unstably and have a low operating speed.

SUMMARY OF THE INVENTION

It is therefore the object of the present invention to specify a digital transformation circuit for the conversion of digital chrominance signals of a cartesian color coordinate system into digital tint and saturation signals of a polar color coordinate system with which the disadvantages of the known, analog function generators can be avoided.

Given the present invention, this object is achieved in that a second cartesian color coordinate system (8) proceeding parallel to the first cartesian color coordinate system (1) is placed through the center point ($P'_o$) of the polar color coordinate system (4), said second cartesian color coordinate system (8) subdividing the polar color coordinate system (4) into four quadrants, whereby quadrant identification numbers are allocated to the quadrants; in that the quadrants into which the digital chrominance signals (X; Y) fall are identified and the appertaining digital quadrant identification numbers are marked; in that the chrominance signals (X; Y) are converted in valves into corresponding coordinate values (X'; Y') of one of the quadrants; in that the saturation signals (S) is determined from the coordinate values (X'; Y') according to the equation $$S = c_1 \sqrt{X'^2 + Y'^2}$$

and the tint signal (T*) of the quadrant is determined according to the equation $$T^* = c_2 \cdot \text{arc tan } Y'/X'$$

and in that the digital tint signals (T) for all quadrants are formed from the marked quadrant identification numbers and from the tint signals (T*) of the quadrants. $c_1$ and $c_2$ are constants or scale factors between the second color coordinate system 8 and the polar coordinate system illustrated in FIG. 2.

It is provided in an advantageous manner that increasing digital quadrant identification numbers are allocated to the individual quadrants in the direction of increasing tint signals (T*) and that the marked quadrant identification numbers respectively form the most significant bits of the tint signals (T) to be determined for all quadrants and the tint signals (T*) of the quadrant respectively form the least significant bits of the tint signals (T) to be determined for all quadrants.

Preferably, the coordinates of the center point ($P'_o$) and the maximum radius of the polar color coordinate system (4) correspond to half the final values of the digital chorminance signals (X; Y) in the first cartesian color coordinate system (1).

The digital quadrant identification numbers are determined from a logical linkage of the respectively most significant bits (MSB) of the digital chrominance signals (X; Y).

It is proposed in an advantageous embodiment that the digital coordinate values X' (Y') are obtained by omission of the most significate bits (MSB) and the inversion of all least significant bits (LSB) of the digital chrominance signals X(Y) in case the appertaining chrominance signals X(Y) lie to the left of the Y'axis (below the X' axis) of the second cartesian color coordinate system (8); and in that the digital coordinate values X'(Y') are obtained by omission of the most significant bits (MSB) and the non-inversion of all least significant bits (LSB) of the digital chrominance signals X(Y) in case the appertaining chrominance signals X(Y) lie to the right of the Y' axis (above the X' axis) of the second color coordinate system (8).

The inversion or non-inversion of all least significant bits of the chrominance signals X and Y is controlled by means of the respective most significant bit.

A preferred further development provides that the values for the functions $$S = c_1 \sqrt{X'^2 + Y'^2}$$

and $$T^* = c_2 \sqrt{\arctan Y'/X'}$$

for one of the quadrants are stored in a table memory which is addressed by means of the digital coordinate values X' and Y'.

The digital tint signals (T) are advantageously inverted in case they fall into the second or fourth quadrants.

In a preferred manner, the inversion of the digital tint signals (T) controls the functions of the marked quadrant identification numbers.

An advantageous improvement consists in that the digital coordinate values (X', Y') are subjected to a place shift before the addressing of the table memory and that the place shift is again reversed for the case for the values read out from the table memory.

It is provided that the plurality of places by which the coordinate values X' and Y' are shifted depends on the size of the appertaining coordinate values X' and Y' and that the coordinate values X' and Y' are subdivided into ranges of values and a corresponding place shift is undertaken in each range of values.

An advantageous coordinate transformation circuit, particularly for the implementation of the method according to claim 1, is characterized by a quadrant recognition stage (11) respectively receiving the most significant bits (MSB) of the digital chrominance signals X and Y for the determination of the digital quadrant identification numbers, by a transformation circuit (10) receiving the digital chrominance signals X and Y for the determination of the corresponding coordinate values X' and Y' of the second cartesian color coordinate system (8), and by a table memory (12) connected to the transformation circuit (10) which can be addressed by means of the coordinate values X' and Y', said table memory (12) being provided for the transformation equations in order to produce the digital tint signals (T) at a first memory output and in order to produce the digital saturation signals (S) at a second memory output.

In an advantageous manner, an inverter (13) for the tint signals (T) which is controlled by the quadrant recognition stage (11) follows the first memory output of the table memory (12).

It is provided that the transformation circuit (10) is designed as an inverter for the least significant each signal bit of the digital chrominance signals X and Y which is driven by the respective most significant bits of the digital chrominance signals X and Y.

A further advantageous embodiment consists therein that a controllable shift stage (46) for the place shift of the coordinate values X' and Y' is disposed between the transformation circuit (10) and the table memory (12), and in that a controllable correction stage (52) follows the second memory output of the table memory (12) in order to reverse the place shift.

The control inputs of the shift stage (46) and of the correction stage (52) are advantageously connected to a control generator (48) which is charged with the coordinate values X' and Y'.

BRIEF DESCRIPTION OF THE DRAWINGS

In the following, the invention is described in greater detail on the basis of FIGS. 1 through 5.

DESCRIPTION OF THE PREFERRED EMBODIMENTS

Figure 1:
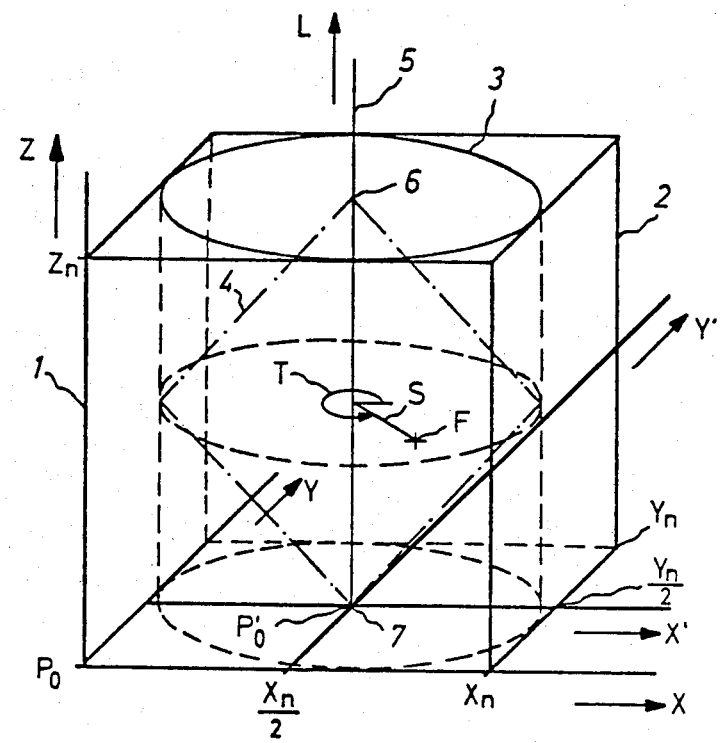
FIG. 1 is a spatial illustration of the chrominance-luminance color space and of the tint-saturation-luminance color space.

In order to explain the coordinate transformation, FIG. 1 shows a cartesian XYZ coordinate system 1 with the coordinate zero point $P_0$. The chrominance-luminance color space 2 is located in the XYZ coordinate system 1. A randomly assumed color location F has the color coordinates X, Y and Z. The color coordinates X and Y correspond to the chrominance signals and the color coordinate Z corresponds to the luminance signal. The chrominance-luminance color space 2 is bounded by the color coordinates $X_n$, $Y_n$ and $Z_n$.

A cylindrical TSL coordinate system 3 with the coordinate zero point $P'_0$ is inscribed into the cartesian XYZ coordinate system 1, said zero point $P'_0$ exhibiting the color coordinates $X_n/2$, $Y_n/2$ and 0 in the XYZ coordinate system 1. The angle T corresponds to the tint signal T; the radius S corresponds to the saturation signal S; and the coordinate L corresponds to the luminance signal L which is identical to the luminance signal in the chrominance-luminance color space 2.

The idealized tint-saturation-luminance color space 4 is indicated with broken lines in the cylindrical TSL coordinate system 3 as a double cone. The gray axis 5 with the white point 6 and the black point 7 extends through the coordinate zero point $P'_0$.

Figure 2:
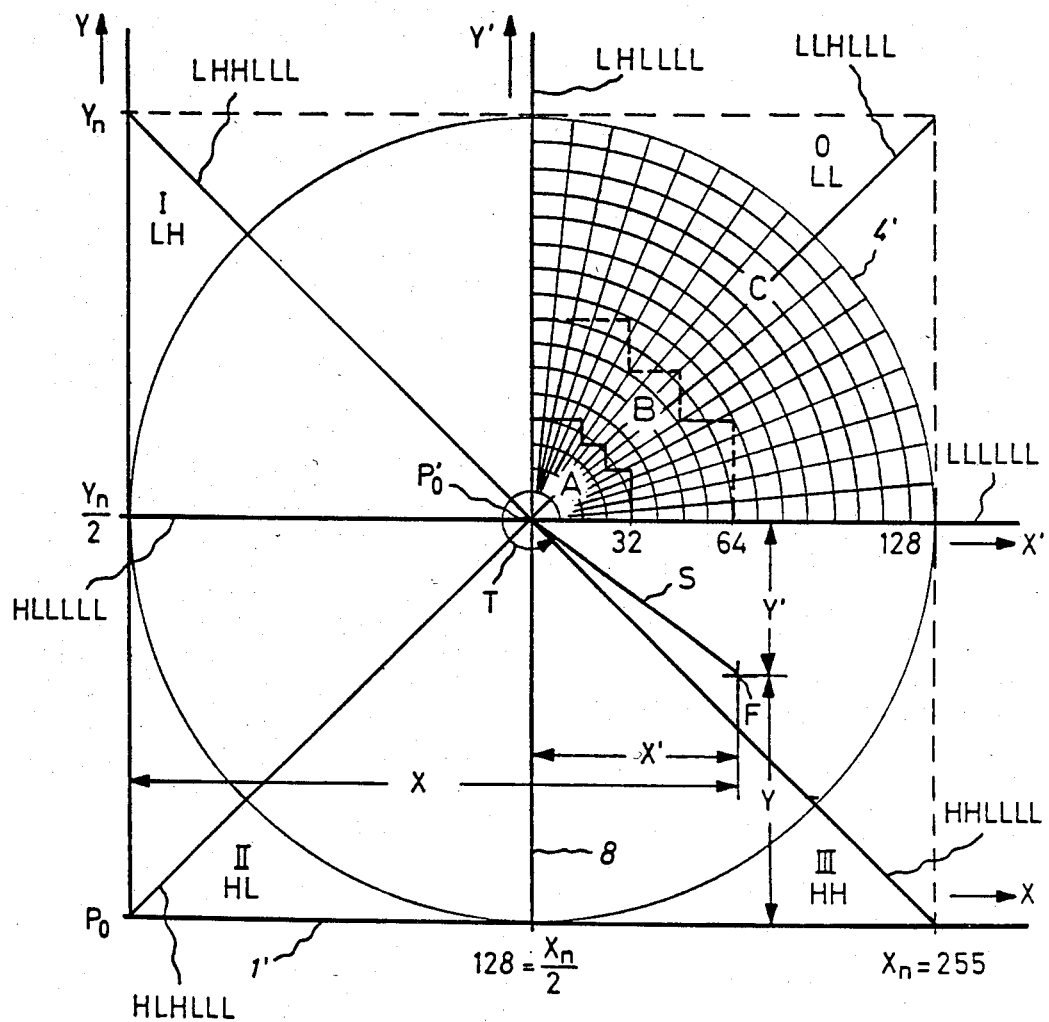
FIG. 2 is a projection of the color spaces.

FIG. 2 shows a projection of the three-dimensional coordinate systems according to FIG. 1 into the XY plane, whereby the coordinate transformation is restored to a two-dimensional problem and, now, the cartesian XY coordinate system 1' and the polar TS coordinate system 4' are considered, since the luminance signals L are identical anyway in both coordinate systems.

A X'Y' coordinate system 8 shifted by the values $X_n/2$ and $Y_n/2$ in comparison to the XY coordinate system 1' extends through the coordinate zero point $P'_0$ of the polar TS coordinate system 4'. The X'Y' coordinate system 8 subdivides the polar TS coordinate system 4' in the direction of increasing angles T into the four quadrants O, I, II and III, whereby the angle T=0 falls on the X' axis. In accord with this numbering, digital quadrant identification numbers of 2-bit each are allocated to the individual quadrants, namely, the quadrant identification number LL to the quadrant 0, the quadrant identification number LH to the quadrant I, the quadrant identification number HL to the quadrant II and the quadrant identification number HH to the quadrant III.

The color location F projected into the XY plane is characterized in the X'Y' coordinate system 8 by the color coordinates X' and Y' and is characterized in the polar TS coordinate system 4' by the angle T and the radius S. The values X' and Y' are chrominance values and correspond to the coordinate values of the second rectangular coordinate system 8 which are calculated from the corresponding chrominance values X and Y which are the coordinate values of the first rectangular coordinate system 1. One pair of chrominance values $\pm X$ and $\pm Y$ define the position of a color location "F" as shown in FIG. 2 in all four quadrants, the pair of chrominance values X' and Y' calculated from them, that is the actual value. The absolute value is considered while the sign defines position.

In order to determine the angle T and the radius S of a color location F, it is first determined by means of the examination of the color coordinates X and Y to determine into which quadrant the color location F falls and the appertaining quadrant identification number is marked, whereby the actual coordinate calculation is advantageously limited to a primary quadrant, to the quadrant 0 in the sample embodiment.

Therefore, in a second step, the color coordinates X' and Y' of the color location F to be investigated can be determined in terms of amount without addition of an operational sign from the corresponding color coordinates X and Y. In a further step, the radii S and the desired saturation signal S respectively are calculated from the color coordinates X' and Y' according to the equations:

$$S = c_1 \sqrt{X'^2 + Y'^2} \quad (1)$$

and the appertaining angle T* is determined, first related to the primary quadrant 0 (angle 0° through 90°), according to the equation:

$$T^* = c_2 \cdot \arctan Y'/X' \quad (2)$$

In the sample embodiment, S and T* have a resolution of 4 bits so that a total of 16 radii S and 16 angles T* per quadrant can be distinguished, these being indicated in FIG. 2 for the primary quadrant 0.

The angles T and the desired digital tint signals T respectively for all four quadrants (angle 0° through 360°) can be derived from the calculated angle T* of 4 bits and from the preceding, marked quadrant identification number of 2 bits so that, given an overall word length of 6 bits, a total of 64 angles and tint signals T respectively can be distinguished.

If, for example, the angle T*=HLLL (45°) and the digital quadrant identification number LH (quadrant I) were determined, then there derives the actual angle T=LHHLLL (135°). In FIG. 2, a few characteristic angles T are indicated as 6 bit words, namely, LLLLLL=0°; LLHLLL=45°; LHLLLL=90°; LHHLLL=135°; HLLLLL=180°; HLHLLL=225° and HHLLLL=270°.

Figure 3:
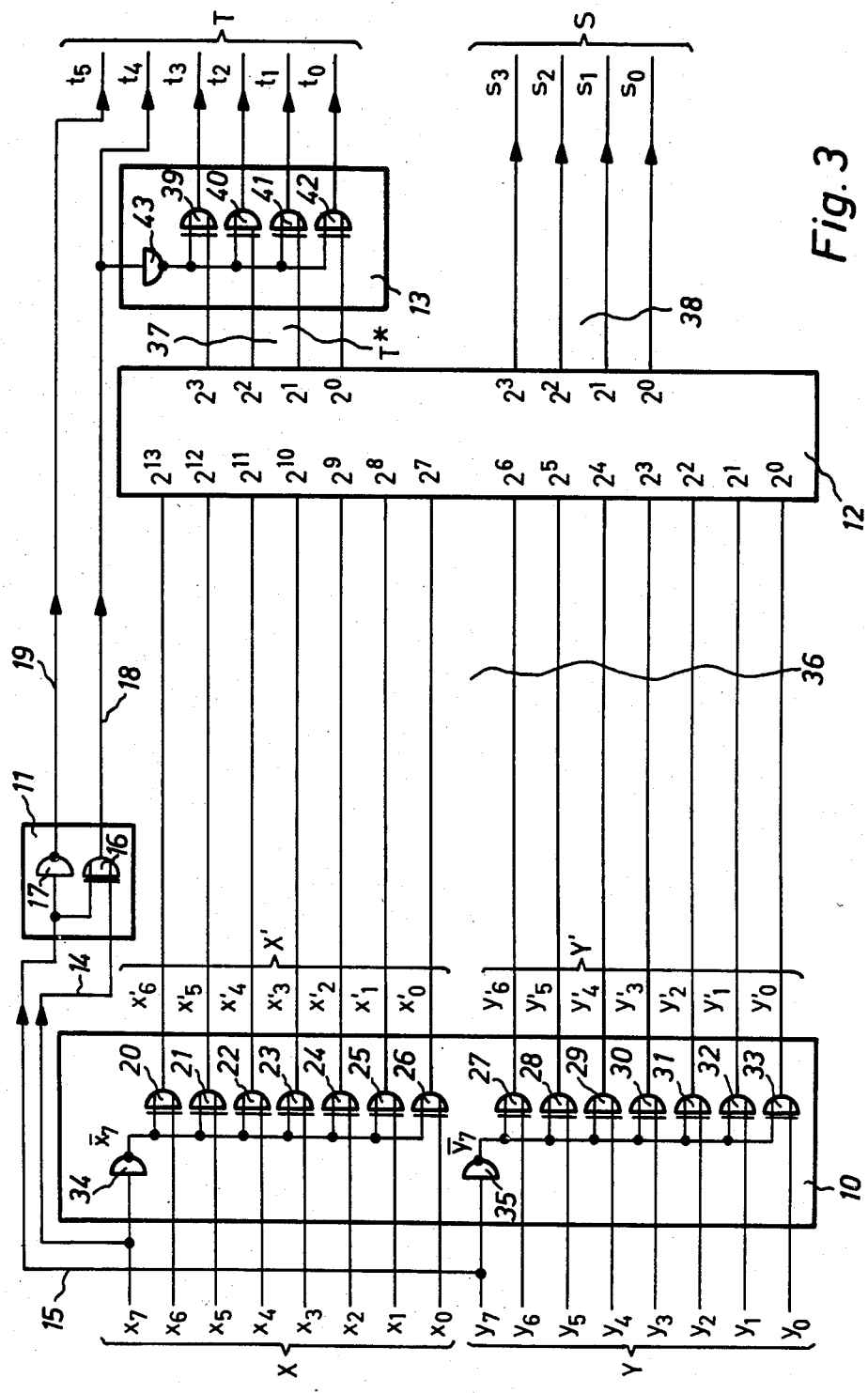
FIG. 3 is a sample embodiment of a digital transformation circuit.

FIG. 3 shows a sample embodiment of a digital coordinate transformation circuit for the conversion of the digital chrominance signals X and Y into the digital tint signals T and the digital saturation signals S. The coordinate transformation circuit consists of an inversion stage 10, of a quadrant recognition stage 11, of a table memory 12 and of a further inversion stage 13.

In the sample embodiment, let the digital chrominance signals X and Y exhibit a respective word length of 8 bits, whereby the individual bits are referenced with small letters and their significances are indicated by means of indices. Given the 8 bit resolution, the final values in the XY coordinate system 1 are $X_n = Y_n = 255$ and, thus, $X_n/2 = Y_n/2 = 127$.

The most significant bits (MSB) $x_7$ and $y_7$ of the chrominance signals X and Y on the lines 14 and 15 are logically evaluated in an exclusive OR gate 16 and an inverter 17 of the quadrant recognition stage 11. The output signals $t_4$ and $t_5$ of the quadrant recognition stage 11 on the lines 18 and 19 form the digital quadrant identification numbers of 2 bit each of those quadrants into which the color locations F to be investigated fall. At the same time, the output signals $t_4$ and $t_5$ are the most significant bits of the digital tint signals T to be determined. In the invention, sixteen digital angular values having a word length of 4 bits are deposited in the tabular storage 12 for the angles between 0° and 90° where the word LLLL=0 corresponds to the angle 0°, the word HLLL=8 corresponds to the angle 45° and the word HHHH=16 corresponds to the angle 90°. On the other hand, the four quadrants are identified by the numerals 0, 1, 2 and 3 which are identified as quadrant identifier numbers and the digital quadrant identifier numbers comprise two bits each produce the numerals 0, 1, 2 or 3 which thus identify the quadrants. Thus, LL=0, LH=1, HL=2 and HH=3. The angle 0° through 360° for all quadrants of the polar color coordinate system are specified by 64 digital angle values of 6 bits each whereby the value LLLLLL=0 corresponds to the angle 0° and the value HHHHHH=64 corresponds to the angle of 360°.

In order to determine the digital angle values of 6 bits each, the stored angle values of 4 bits each and the quadrant identifier numbers of 2 bits each are combined such that the four bits of the stored angle values form the least significant bits LSB and the two bits of the quadrant identifier number form the two most significant bits MSB of the angle values. When the quadrant identifier numbers are allocated to the angles 0°, 90°, 180° and 270°, the combination described above can be interpreted as addition of the angle values read out from the table memory 12 with the corresponding angles of 0°, 90°, 180° or 270°.

As can be seen from FIG. 2, the values $X \geq 128$ AND $X < 128$ supply a statement concerning whether the color location F to be investigated lies to the right (quadrant 0; III) or to the left (quadrant I;II) of the Y' axis and the values $Y \geq 128$ and $Y < 128$ supply the corresponding statement as the whether the color location F lies above (quadrant 0;I) or below (quadrant II;III) of the X' axis. The appertaining quadrants are determined by means of examining the respective most significant bits (MSB) $x_7$ and $y_7$ according to the following Table:

$X \leq 128 \hat{=} x_7 = H$ (quadrant 0 or III)

$X < 128 \hat{=} x_7 = L$ (quadrant I or II)

$Y \leq 128 \hat{=} y_7 = H$ (quadrant 0 or I)

$Y < 128 \hat{=} y_7 = L$ (quadrant II or III) \quad (9)

These relationships are evaluated in the exclusive OR gate 16 and in the inverter 17 of the quadrant recognition stage 11 according to the following truth table:

| MSB | | Q-K-No. | | |
| --- | --- | --- | --- | --- |
| $x_7$ | $y_7$ | $t_4$ | $t_5$ | Quadrant |
| H | H | L | L | 0 |
| L | H | H | L | I |
| L | L | L | H | II |
| H | L | H | H | III |

According to FIG. 2, the digital color coordinates X' and Y' of the X', Y' coordinate system 8 are determined in terms of amount without the addition of an operational sign in the inversion stage 10.

To that end, the remaining bits (LSB) $x_0$ through $x_6$ of the digital chrominance signal X in the inversion stage 10 are forwarded to a first group of seven exclusive OR gates 20 through 26 and the corresponding, remaining bits $Y_0$ through $Y_6$ of the digital chrominance signal Y are forwarded to a second group consisting of a further seven exclusive OR gates 27 through 33. All exclusive OR gates 20 through 26 of the first group are connected to an inverter 34 in which the most significant bit (MSB) $x_7$ of the digital chrominance signal X is inverted. All exclusive OR gates 27 through 33 of the second group are connected to a further inverter 35 which inverts the most significant bit (MSB) $y_7$ of the digital chrominance signal Y. The bits $x'_0$ through $x'_6$ at the outputs of the exclusive OR gates 20 through 26 or, respectively, the bits $y'_0$ through $y'_6$ at the outputs of the exclusive OR gates 27 through 33 form the digital color coordinates X' and Y' of the shifted X'Y' coordinate system 8 according to FIG. 2.

An inversion or non-inversion of all least significant bits (LSB) $x_0$ through $x_6$ or, respectively, $y_0$ through $y_6$ of the digital chrominance signals X and Y which is controlled by the most significant bits (MSB) $x_7$ or, respectively, $y_7$, is carried out with the assistance of the exclusive OR gates 20 through 26 or, respectively, 27 through 33 according to the Tables:

| $x_7$ | x' | $y_7$ | y' | |
|---|---|---|---|---|
| L | $\overline{x_0 \text{ through } x_6}$ | L | $\overline{y_0 \text{ through } y_6}$ | (11) |
| H | $x_0$ through $x_6$ | H | $y_0$ through $y_6$ | | wherein, for example, the most significant bit $x_7 = L$, then the corresponding color location F lies in quadrant I or II, and the color coordinates X' are calculated, in accord with FIG. 2, according to the relationship $X' = X - 127$ which is realized in the digital range by means of omission of the most significant bits (MSB) and inversion of all least significant bits (LSB). When, on the other hand, $x_7 = H$, then the color location F is situated in quadrant 0 or III and the appertining color coordinates X' derive according to the equations $X' = 128 - X$ which is solved in the digital range by means of the omission of the most significant bits (MSB) and the non-inversion of all least significant bits (LSB). The bit $y_7$ is evaluated in the same manner.

The digital color coordinates X' and Y' of 7 bits each obtained in the inversion stage 10 cell in the 14 bit addresses of the table memory 12 via the lines 36. A 4 bit tint value T* ($t_0$ through $t_3$) and 4 bit saturation values S ($s_0$ through $s_3$) which were calculated for the primary quadrants according to the above equations (1) and (2) are deposited for each X'Y' value combination in the table memory 12 with a memory capacity of 16 K×8. Thus, as a function of the X'Y' value combinations, 16 digital saturation values S and 16 digital tint values T* per quadrant can be called in from the table memory 12. Before filling the table storage 12, the appertaining hue values T* and the color saturation values S are calculated according to equations (1) and (2) for all possible combinations of chrominance values X' and Y' and are tabularly retained. For example, the hue values $T^*_{2/5} = \arctan 5/2$ and the color saturation values $S_{2/5} = \sqrt{2^2 + 5^2}$ for the combination of chrominance values $X' = 2$ and $Y' = 5$. One memory location in the tabular storage 12 is allocated to every possible value combination of X' and Y' in said memory location being addressable by the allocated value combination of X' and Y' and the hue value T* and color saturation value S calculated for the corresponding value combination is deposited at the memory location. When, for example, the address $X' = 2$ and $Y' = 5$ is called in in the tabular storage 12 by the calculated chrominance values, then the previously calculated function values $T^*_{2/3}$ and $S_{2/5}$ are stored in the memory location called in by this address. Thus, the calculated function values $T^* = f(X', Y')$ or, respectively, $S = f(X', Y')$ which can be obtained from the corresponding variables X' and Y' are stored in the tabular storage 12.

The tint values T* fed out from the table memory 12 form the least significant bits ($t_0$ through $t_3$) and the quadrant identification numbers ($t_4$ and $t_5$) obtained in the quadrant recognition stage 11 form the most significant bits of the sought digital tint signals T with a word length of 6 bits.

In case the color location F to be investigated lies in quadrant I or III, the digital tint signls T* are inverted in the inverter stage 13 which is connected to the output 37 of the table memory 12. The inverter stage 13 consists of four exclusive OR gates 39 through 42 which are driven by the output signal $t_4$ of the quadrant recognition stage 11 via a further inverter 43.

It is achieved by means of the controlled inversion that the tint signals T* steadily rise from 0 through 63 or, respectively, the angles steadily rise from 0° through 360° from quadrant to quadrant.

Figure 4:
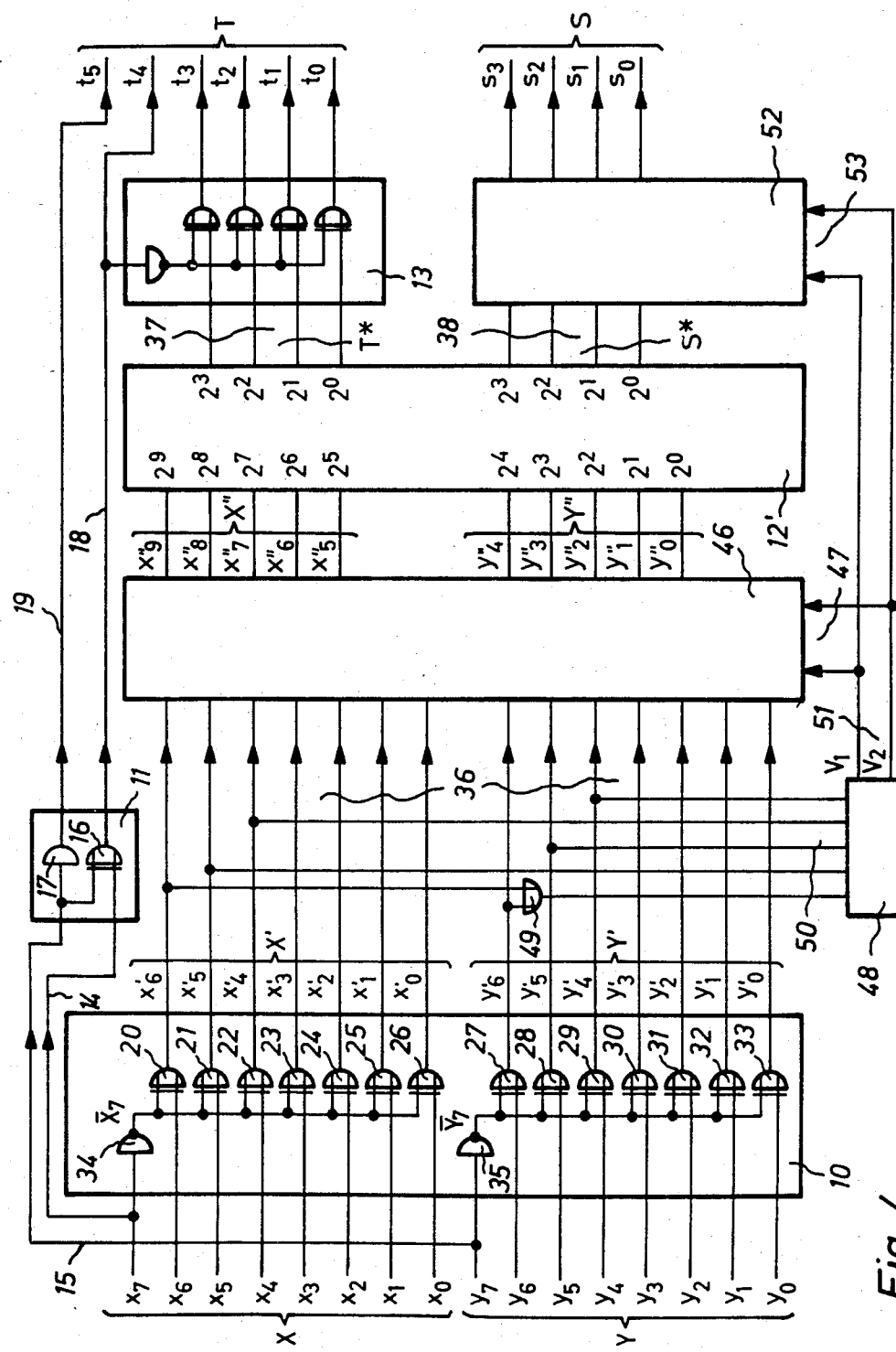
FIG. 4 is a further sample embodiment of a digital transformation circuit.

FIG. 4 shows a further sample embodiment of a coordinate transformation circuit. Whereas the table memory 12 in the embodiment according to FIG. 3 has a capacity of 16 K×8 bit, the table memory 12' in FIG. 4 has a smaller capacity, for example, a capacity of 1 K×8 bit. Among other things, the smaller capacity has the advantage that the access time is shorter and, thus, the operating speed of the coordinate transformation circuit is higher.

Whereas the color coordinates X' and Y' obtained in the inverter stage 13 continue to exist as two 7 bit data, only two 5 bit addresses can be selected given the small table memory 12'. In this case, the least significant bits of the color coordinates X' and Y' would not be considered but this would lead to an imprecise coordinate conversion.

The chrominance signals X' and Y' are generated in the transformation stage 10 with respective word lengths of 7 bits ($X'_0$ through $X'_6$ or, respectively, $Y'_0$ through $Y'_6$). Whereas the table memory 12 according to FIG. 3 is addressed by addresses having a respective 7 bit word length, addresses having a word length of 5 bits suffice for addressing the table memory 12' according to FIG. 4 which has a lower memory capacity in comparison to the table memory 12, so that the two least significant bits ($X'_0$; $X'_1$ or, respectively $Y'_0$; $Y'_1$) of the chrominance signals would normally be lost. This case is presented in the subsequent following description. When lower order bits of a word are not further processed, then it is said that the less significant bits are stripped.

It is known that the information of a digital word resides in the less significant bits given low values, resides in the moderate bits given moderate values and resides in the more significant bits given high values. When, thus, the less significant bits are stripped, this naturally leads to a loss of information. For example, when the last bit is stripped, both the word HLL = 4 as well as the word HLH = 5 are interpreted as "4". This loss of information due to stripping would lead to an imprecise memory addressing in the present case and, thus, to imprecise hue values T* and color saturation values S. Therewith, the transformation of the chrominance signals X and Y of the Cartesian color coordinate system into the hue signals T and color saturation signals S of the polar coordinate system would also be imprecise.

The afore-mentioned imprecise transformation of the chrominance signals X and Y into the hue signals T and color saturation signals S due to stripping of the less significant bits is avoided by means of shifting the memory addresses. Shifting is a dislocation of the places or, respectively, significances within a word and corresponds to a multiplication, whereby a multiplication by the factor 2 is achieved given a shift of one place.

In order to improve the precision, particularly given the calculation of the digital tint signals T from small color coordinate values X' and Y', a controllable shift stage 46 (shifter) is connected preceding the table memory 12'. A place shift of the color coordinates X' and Y' in an upward direction and in accord with a multiplication by a factor "a" is executed with the shift stage 46, whereby the number of places by which the shift is carried out depends on value ranges A, B and C for the digital color coordinates X' and Y'. After a place shift, the table memory 12' is no longer addressed by the color coordinates X' and Y' but, rather, by the increased color coordinates $X''=aX'$ and $Y''=aY'$. In this case, the digital tint signals T* and saturation signals S derive according to the equations:

$$S = c_1 \sqrt{(aX')^2 + (aY')^2}$$

$$S = c_1 \cdot a \sqrt{X'^2 + Y'^2} \qquad (12)$$

and $$T^* = c_2 \cdot \arctan aX'/aX' \qquad (13)$$

The value ranges A, B and C are entered in FIG. 2 for quadrant I. Smaller values of X' and Y' fall in the value range A, medium values fall in the value range B, and large values fall in the value range C.

In range A, the shift circuit 46 produces the following linkages:

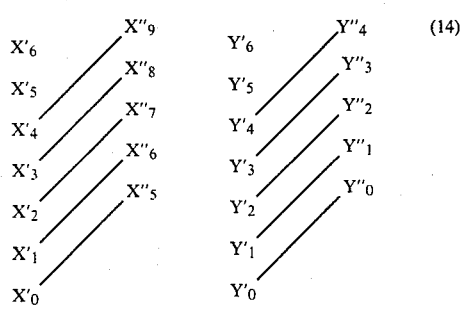

(14)

The digital color coordinates X' and Y' are shifted upward by two places ($a=4$). The least significant bits $x'_0$ and $x'_1$ as well as $y'_0$ and $y'_1$ are evaluated. The most significant bits $x'_6$ and $x'_5$ as well as $y'_6$ and $y'_5$ are not taken into consideration since they are 0 anyway.

In the value range B, the shift circuit 46 produces the following linkage:

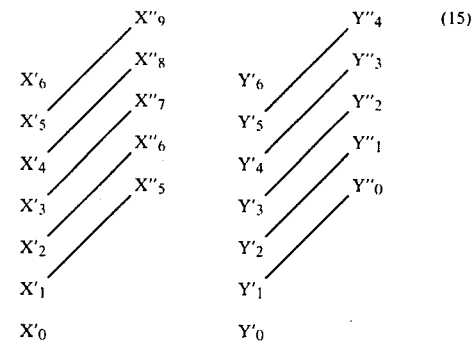

(15)

The digital color coordinates X' and Y' are shifted upward by one plce ($a=2$). In this case, only the respective lowest value bits $x'_0$ and $y'_0$ of the color coordinates are lost. Their most significant bits $x'_6$ and $y'_6$ need not be considered since they are 0.

In the value range C, the following linkages are produced by the shift circuit 46:

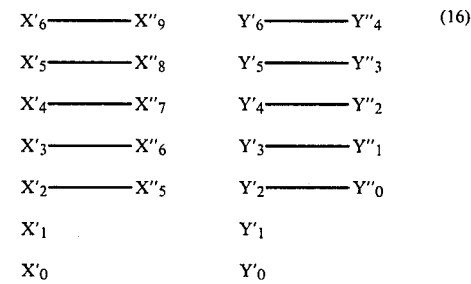

(16)

The digital color coordinates X' and Y' are through-connected in even parity ($a=1$) and the least significant bits $x'_0$ and $x'_1$ as well as $y'_0$ and $y'_1$ are disregarded.

An integrated four bit shifter of the type Am25S10 manufactured by Advanced Micro Devices, Inc. can, for example, be employed as the shift stage 46. These modules are driven by two bit shift commands $V_1$ and $V_2$ at a control input 47 according to the following Table:

| Value Range | Shift | Shift Command | |
|---|---|---|---|
| | | $V_1$ | $V_2$ |
| A | 2x | H | L |
| B | 1x | L | H | (17) |
| C | 0 | L | L |

The value ranges A, B and C can be defined by the bits $x'_4$, $x'_5$, $x'_6$, $y'_4$, $y'_5$ and $y'_6$ of the digital color coordinates X' and Y'. These bits address a read-only memory 48 (PROM) after a linkage of the bits $x'_6$ and $y'_6$ in an OR gate 49 via the address inputs 50. The shift commands $V_1$ and $V_2$ are stored in the read-only memory 48 as a function of the value ranges A, B and C. These shift commands arrive at the control inputs 47 of the shift stage 46 via a line 51.

As proceeds from the above equations (12) and (13), digital saturation signals S which are too large by the factor "a" and must be corrected are obtained for the value ranges A and B. For this reason, a corresponding correction stage 52 follows the output 38 of the table memory 12', said correction stage 52 being likewise driven by the shift commands $V_1$ and $V_2$ on the lines 51 via the control inputs 53. The correction stage 52 undertakes a place shift directed downward which corresponds to a division by the factor "a".

Figure 5:
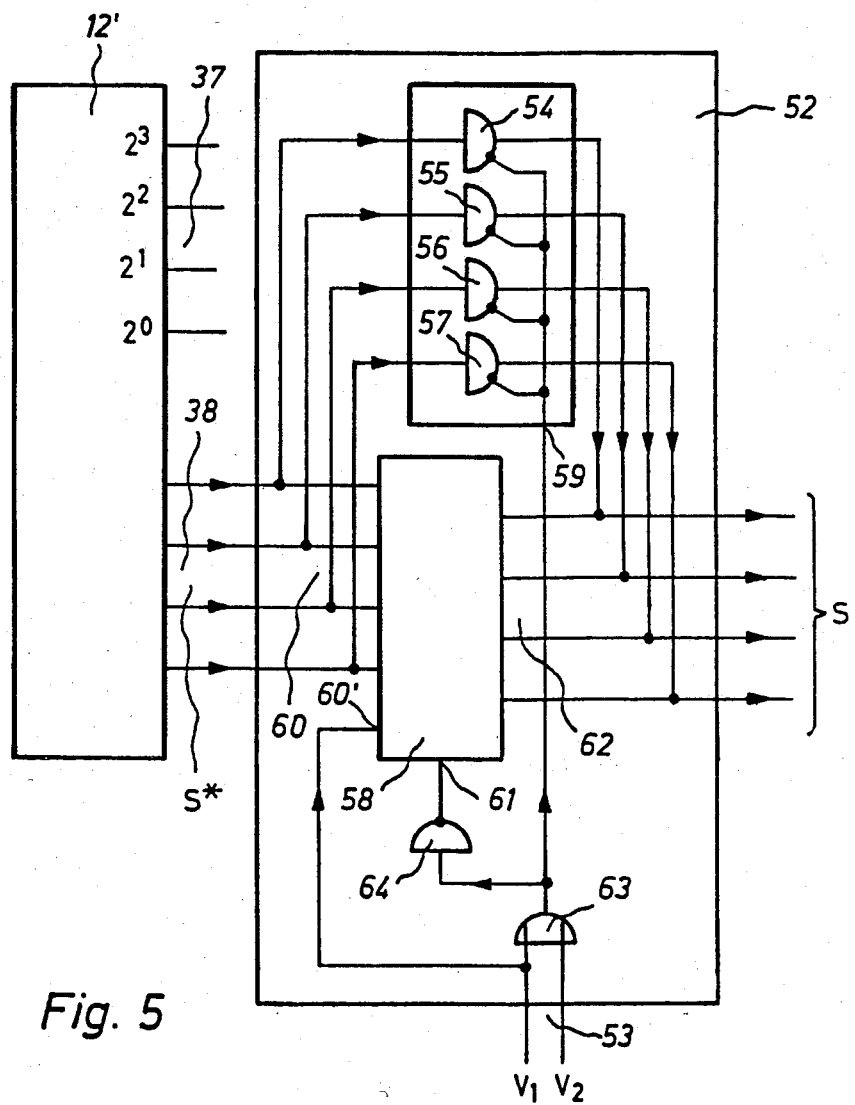
FIG. 5 is a sample embodiment of a correction stage.

The correction stage 52 can be designed either as a shift stage (shifter) which corresponds in its mode of functioning to the shift stage 46 or, on the other hand, can be designed according to FIG. 5. Instead of the table memory 12 in FIG. 3 with the capacity of 16K×8 bit or instead of the table memory 12' in FIG. 4 with the capacity of 1K×8 bit, of course, two separate table memories with respectively 16K×4 bit and 1K×4 bit could be employed, whereby the digital tint signals T are deposited in the first table memory and the digital saturation signals S are deposited in the second table memory.

In this case, a variation of the coordinate transformation circuit illustrated in FIG. 4 could consist therein that the shift circuit 46 is only pre-connected to the first table memory, whereas the second table memory is addressed directly by the inverter stage 10. Then, however, the respective least significant bit $x'_0$ and $x'_1$ as well as $y'_0$ and $y'_1$ of the color coordinates X' and Y' would have to be thrown out, whereby the coordinate calculation would become less accurate. The variation, however, has the advantage that a correction of the saturation signals S could be eliminated. The rounding-off of the result could be programmed into the second table memory.

FIG. 5 shows an advantageous embodiment of the correction stage 52.

The correction stage 52 essentially consists of four controllable gates 54 through 57 and of a programmable read-only memory 58 (PROM).

The gates 54 through 57 (of the type SN74LS244 of Texas Instruments Inc., for example) are connected to the outputs 38 of the table memory 12'. The gate exhibit 3 state outputs whose states are controlled from a release input 59 in such manner that the lines are through-connected given a log. "L" at the release input 59 (output low-resistant) and are blocked given a log. "H" (output high-resistant).

The read-only memory 58 (for example, type SN74S288) with a capacity of 32×8 bits likewise exhibits 3 state outputs whose states are controlled proceeding from a release input 61. Since both the gates as well as the read-only memories exhibit 3 state outputs, the output lines can be directly connected.

The read-only memory 58 has two memory areas of 16 bit each into which the respective data of the table memory 12' divided by a=4 or, respectively, a=2 and, if need be, rounded-off are deposited. These data are selected via four of the 5 bit address inputs 60 which are connected to the outputs 38 of the table memory 12'. The selection of the memory area is made by the fifth address input 60'.

The control inputs 53 of the correction stage 52, at which the shift commands $V_1$ and $V_2$ appear, are connected via an OR gate 63 to the release input 59 of the gates 54 through 57 and are connected via an inverter 64 to the release input 61 of the read-only memory 58. The address input 60' of the read-only memory 58 has the shift command $V_1$ as a control bit.

The manner of functioning of the correction stage 52 is as follows: in that case in which no place shift has occurred in the shift circuit 46 (cf. Table 17; $V_1 = V_2 = L$), the gates 54 through 57 are through-connected and no correction of the digital saturation signals S* read out from the table memory 12' occurs. In that case, however, in which a place shift by "1" or "2" was executed in the shift circuit 46 (Table 17; $V_1 = H$ or L; $V_2 = L$ or H), the gates 54 through 57 are blocked and the outputs 62 of the read-only memory 58 are effective. Then, the digital saturation signals S* read out from the table memory 12' address the read-only memory 58 and the shift command $V_1$, as a control bit, decides at the address input 60' whether the saturation signals S is to be divided and, thus, corrected by the factor "2" or "4" are to be read out of the read-only memory 58.

COMMERCIAL UTILIZATION

The invention can be used in all fields in which cartesian color coordinates are to be converted into polar color coordinates. It is advantageously employed in the field of electronic reproduction technology, particularly in color correction and color recognition.

| List of Reference Numerals | |
| --- | --- |
| 1 | XYZ coordinate system |
| 2 | Chrominance-luminance color space |
| 3 | TSL coordinate system |
| 4 | Tint-saturation-luminance color space |
| 5 | Gray axis |
| 6 | White point |
| 7 | Black point |
| 8 | X'Y' coordinate system |
| 9 | — |
| 10 | Inverter stage |
| 11 | Quadrant identification stage |
| 12 | Table memory |
| 13 | Inverter stage |
| 14 | Line |
| 15 | Line |
| 16 | Exclusive OR gate |
| 17 | Inverter |
| 18 | Line |
| 19 | Line |
| 20 | Exclusive OR gate |
| 21 | " |
| 22 | " |
| 23 | " |
| 24 | " |
| 25 | " |
| 26 | " |
| 27 | " |
| 28 | " |
| 29 | " |
| 30 | " |
| 31 | " |
| 32 | " |
| 33 | " |
| 34 | Inverter |
| 35 | Inverter |
| 36 | Line |
| 37 | Output |
| 38 | Output |
| 39 | Exclusive OR gate |
| 40 | Exclusive OR gate |
| 41 | Exclusive OR gate |
| 42 | Exclusive OR gate |
| 43 | Inverter |
| 44 | — |
| 45 | — |
| 46 | Shift stage |
| 47 | Control input |
| 48 | Read-only memory |
| 49 | OR gate |
| 50 | Address inputs |
| 51 | Line |
| 52 | Correction stage |
| 53 | Control input |
| 54 | Gate |
| 55 | Gate |
| 56 | Gate |
| 57 | Gate |
| 58 | Read-only memory |

-continued

| List of Reference Numerals | |
|---|---|
| 59 | Release input |
| 60 | Address inputs |
| 61 | Release input |
| 62 | Outputs |
| 63 | OR gate |
| 64 | Inverter |

We claim:

1. A coordinate transformation circuit for converting digital chrominance signals of a first cartesian color coordinate system into digital hue signals and saturation signals of a polar color coordinate system, whereby a second cartesian color coordinate system (8) with axes parallel to the first cartesian color coordinate system (1) is placed through the center point ($P'_o$) of the polar color coordinate system (4), said second cartesian color coordinate system (8) dividing the polar color coordinate system (4) into four quadrants, which are defined by digital quadrant identification numbers, comprising:
   a. means for converting the pairs of digital chrominance signal values (X; Y), defining the positions of the color locations (F) within the first cartesian color coordinate system (1) into corresponding pairs of second chrominance signal values (X'; Y'), defining the relative positions of said color locations (F) within a selected quadrant of the second cartesian color coordinate system (8),
   b. means for generating digital hue signal values (T*) for said selected quadrant and saturation signal values (S) from said pairs of second chrominance signal values (X'; Y') according to the equations:

$$T^* = C_2 \text{ arc tan } (Y'/X') \text{ and}$$

$$S = C_1\sqrt{X'^2 + Y'^2}$$

wherein $C_1$ and $C_2$ are constant factors, and
   c. means for determining the quadrant identification numbers of the quadrants, in which the respective color locations (F) fall, from said first chrominance signal values (X; Y), whereby the hue signal values (T) for all quadrants are obtained from said determined quadrant identification numbers and said hue signal values (T*) of said selected quadrant.

2. A coordinate transformation circuit according to claim 1, comprising allocating increasing digital quadrant identification numbers to the individual quadrants in the direction of increasing tint signals (T); and in that the marked quadrant identification numbers respectively form the most significant bits of the tint signals (T) to be determined for all quadrants and the tint signals (T*) of the quadrant respectively form the least significant bits of the tint signals (T) to be determined for all quadrants.

3. A coordinate transformation circuit according to claim 2, characterized in that the coordinates of the center point ($P'_o$) and of the maximum radius of the polar color coordinate system (4) correspond to half the final values of the digital chrominance signals (X;Y) in the first cartesian color coordinate system (1).

4. A coordinate transformation circuit according to claim 1, characterized in that the digital quadrant identification numbers are determined from a logical linkage of the respective most significant bits (MSB) of the digital chrominance signals (X;Y).

5. A coordinate transformation circuit according to claim 1, characterized in that the digital coordinate values X'(Y') are obtained by omission of the most significant bits (MSB) and inversion of all least significant bits (LSB) of the digital chrominance signals X(Y) in case when the appertaining chrominance signals X(Y) lie to the left of the Y' axis (below the X' axis) of the second cartesion color coordinate system (8); and in that the digital coordinate values X'(Y') are obtained by omission of the most significant bits (MSB) and non-inversion of all least significant bits (LSB) of the digital chrominance signals X(Y) in case when the appertaining chrominance signals X(Y) lie to the right to the Y' axis (above the X' axis) of the second color coordinate system (8).

6. A coordinate transformation circuit according to claim 5, characterized in that the inversion or non-inversion of all least significant bits of the chrominance signals X and Y is controlled by the respective most significant bit.

7. A coordinate transformation circuit according to claim 1, characterized in that the functions:

$$S = c_1\sqrt{X'^2 + Y'^2}$$

and $$T^* = c_2 \cdot \text{arc tan } Y'/X'$$

are stored for one of the quadrants in a table memory which is addressed by the digital coordinate values X' and Y'.

8. A coordinate transformation circuit according to claim 1, characterized in that the digital tint signals (T) are inverted in case they fall in the second or fourth quadrants.

9. A coordinate transformation circuit according to claim 8, characterized in that the inversion of the digital tint signals (T) is controlled as a function of the quadrant identification numbers.

10. A coordinate transformation circuit according to claim 9, characterized in that the digital coordinate values (X';Y') are subjected to a place shift before the addressing of the table memory; and the place shift is again reversed for the values read out of the table memory.

11. A coordinate transformation circuit according to claim 10, characterized in that the number of places by which the coordinate values X' and Y' are shifted depends on the value of the appertaining coordinate values X' and Y'.

12. A coordinate transformation circuit according to claim 10, characterized in that the coordinate values X' and Y' are subdivided into value ranges and a corresponding place shift is undertaken for each value range.

13. A coordinate transformation circuit for converting digital chrominance signals of a cartesian color coordinate system into digital hue signals and saturation signals of a polar color coordinate system, whereby a second cartesian color coordinate system (8) with axes parallel to the first cartesian color coordinate system (1) is placed through the center point ($P_o'$) of the polar color coordinate system (4), said second cartesian color coordinate system (8) dividing the polar color coordinate system (4) into four quadrants, which are defined by digital quadrant identification numbers, comprising:
   a. a table memory (12; 12') for storing digital hue signal values (T*) and saturation signal values (S) calculated from second chrominance signals (X'; Y') of a selected quadrant of the second cartesian color coordinate system (8) according to the equations:

$$T^* = C_2 \text{ arc tan } Y'/X'\text{ and}$$
$$S = C_1\sqrt{X'^2 + Y'^2}$$

wherein $C_1$ and $C_2$ are constant factors said saturation signal values (S) and said hue signal values (T*) being addressable by said corresponding chrominance signal values (X'; Y'), said table memory (12; 12') having address-inputs and respective hue signal value outputs (37) and saturation signal value outputs (38), b. an inversion stage (10) connected to the address-inputs of the table memory (12; 12') and supplied with the first digital chrominance signals (X, Y) of the first cartesian color coordinate system (1) for inverting each pair of the supplied first digital chrominance signal values (X; Y) into a corresponding pair of second chrominance signal values (X'; Y) of the second cartesian color coordinate system within said selected quadrant; said second chrominance signal values (X'; Y') representing the addresses for said table memory (12; 12'), c. a quadrant recognition stage (11) supplied with the most significant bits (MSB) of said first digital chrominance signal values (X; Y) for recognizing the digital quadrant identification number of the quadrant in which each pair of first chrominance signal values (X; Y) falls at outputs of the quadrant recognition stage (11); and d. an inverter-stage (13) connected to the hue signal value outputs (37) of the table memory (12; 12') and to the outputs of the quadrant recognition stage (11), said inverter-stage (13), being controlled by said quadrant recognition stage (11), inverting or not inverting the hue signal values (T*) in dependence of the recognized digital quadrant identification numbers, whereby the digital quadrant identification numbers represent the most significant bits (MSB) and the inverted or not inverted hue signal values (T*) of the selected quadrant the least significant bits (LSB) of the digital hue signal values of the polar color coordinate system (4).

14. A coordinate transformation circuit according to claim 13, wherein the inversion stage (10) consists of inverters for the least significant bits (LSB) of the first chrominance signal values (X; Y) which are controlled by the respective most significant bits (MSB) of said first chrominance signal values (X; Y).

15. A coordinate transformation circuit according to claim 13, further comprising: a shift stage (46), connected to the outputs of the inversion stage (10) and to the address-inputs of the table memory (12') for shifting the addresses of the table memory (12') in dependence of the second chrominance signal values (X'; Y), a correction stage (52) connected to the saturation signal value-outputs (38) of the table memory (12') for correcting the saturation signal values incorrectly read from the table memory (12') by said shifted addresses; and a control generator (48) connected to said shift stage (46) and to said correction stage (52) and being supplied with said second chrominance signal values (X'; Y') for controlling the shifting- and correction process in dependence of the second chrominance signal values (X'; Y').

* * * * *